Figure 1:
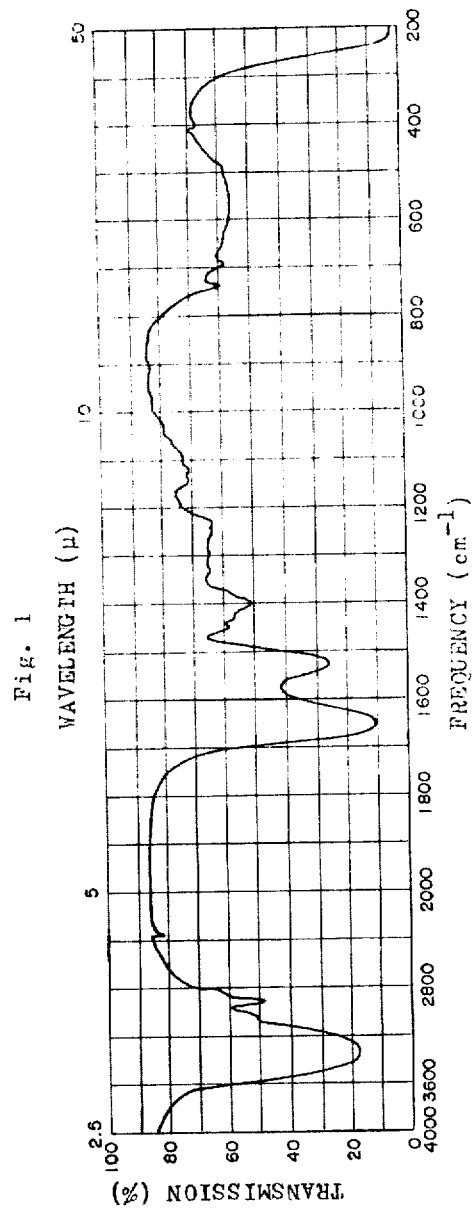

United States Patent [19]
Shoji et al.

[11] 3,890,436
[45] June 17, 1975

[54] ANTIBIOTIC GP-3 AND PRODUCTION THEREOF BY CULTIVATION OF *BACILLUS CEREUS*

[75] Inventors: Jun'Ichi Shoji; Mikao Mayama, both of Osaka; Shinzo Matsuura, Itami; Kouichi Matsumoto, Toyonaka; Yoshiharu Wakisaka, Takarazuka, all of Japan

[73] Assignee: Shionogi & Company, Ltd., Japan

[22] Filed: Apr. 15, 1974

[21] Appl. No.: 461,434

[30] Foreign Application Priority Data
Apr. 25, 1973  Japan.............................. 48-47412

[52] U.S. Cl. ............................................... 424/118
[51] Int. Cl. ........................................... A61k 27/00
[58] Field of Search ............................ 424/117–119

[56] References Cited
UNITED STATES PATENTS

| | | | |
|---|---|---|---|
| 3,689,640 | 9/1972 | Shahani et al. | 424/118 |
| 3,697,647 | 10/1972 | Matsuoka et al. | 424/118 |

*Primary Examiner*—Albert T. Meyers
*Assistant Examiner*—Daren M. Stephens
*Attorney, Agent, or Firm*—Wenderoth, Lind & Ponack

[57] ABSTRACT

A new antibiotic, Gp-3, being useful as a medicament and veterinary drug for inhibiting the growth of gram-positive pathogenic microorganism, and a process for preparing the same, being characterized by cultivating a Gp-3-producing strain of microorganism belonging to the Genus Bacillus in an aqueous nutrient medium under aerobic conditions.

5 Claims, 1 Drawing Figure

Gp-3 (free base)

ANTIBIOTIC GP-3 AND PRODUCTION THEREOF BY CULTIVATION OF *BACILLUS CEREUS*

The present invention relates to a novel antibiotic, Gp-3, and production thereof.

In particular, the invention relates to a novel antibiotic, Gp-3, having antibacterial activity, and to a method for producing the antibiotic, Gp-3, characterized by cultivating an antibiotic Gp-3-producing strain of Bacillus in an aqueous nutrient medium under aerobic conditions and recovering Gp-3 from the culture broth.

In the course of a search for new fermentation products, it has newly been discovered that a microorganism belonging to *Bacillus cereus* species indexed No. Gp-3 in the collection of Shionogi Research Laboratory, Shionogi & Co., Ltd., Osaka, Japan, and on deposit with the Fermentation Research Institute (a division of the agency of industrial science and technology, Japan) under the accession number FERM-P 1895 and with the American Type Culture Collection under the accession number ATCC 21928, produces a new antibiotic, Gp-3, when cultivated in an aqueous nutrient medium under aerobic conditions. The present invention has been accomplished on the basis of this discovery. Accordingly, the principal object of the invention is to provide a new and useful antibiotic which is active against gram-positive pathogenic microorganisms. This and other objects which will be apparent to those conversant with the art to which the present invention pertains from the subsequent description, are achieved by the present invention.

*Bacillus cereus* No. Gp-3 was isolated from a soil sample collected at Guam island and shows the following taxonomic characteristics. The examination of the taxonomic characteristics was conducted according to the method described in "Manual of Microbiological Methods (1957) by the Society of American Bacteriologists (McGraw-Hill Book Co., Inc., New York)."

I. Morphological characteristics (Nutrient agar slant, 30°C, 1–3 days).
1. Form and arrangement: Rods, usually occurring in short to long chains.
2. Motility: Non-motile.
3. Flagella: Peritrichous flagella.
4. Size: Mainly 1.0–1.1 × 3–5 $\mu$.
5. Irregular form: Not observed.
6. Sporangia: Not definitely swollen.
7. Endospore: 1.0 to 1.5 $\mu$, oval. Thin-walled. Not easily stain.
8. Gram staining: positive.
9. Acid fast staining: Negative.
10. Vacuole: Observed (Nutrient agar)

II. Cultural characteristics
A. Agar colonies (Nutrient agar plate, 30°C, 1–3 days).
1. Form: Circular. The form changes to slightly erose with aging.
2. Surface: Not shining.
3. Edge: Entire at very early period of growth. With aging, the edge becomes immature erose to filamentous.
4. Elevation: Convex to raised.
5. Consistency: Soft.
6. Optical density: Opaque.

B. Agar stroke (Nutrient agar slant, 30°C, 1–7 days).
1. Growth: Moderate, Rapid growth.
2. Form: Filiform to slightly arborescent.
3. Chromogenesis of cell: Not chromogenic.
4. Surface: Not shining.
5. Consistency: Soft to slightly butyrous.
6. Optical density: Opaque.

C. Liquid medium (Nutrient medium, 30°C, 1–14 days).
Growth on surface: Ring at early period of growth. With aging, the ring becomes thicker.
2. Growth in medium: Granular or cloudy turbidity in upper layer at early period of growth. A sediment develops with aging.

D. Gelatin stab (Gelatin-yeast extract medium, 28°C, 1–15 days).
1. Growth: good.
2. Liquefaction: Liquefied in 6–15 days.

E. Litmus milk (28°C, 1–7 days).
1. Litmus reaction: Acid produced. Reduction of Litmus observed at 6 days and later.
2. Peptonization: Positive.
3. Coagulation: Not observed.

III. Physiological characteristics.
1. Oxygen requirement: Facultative anaerobic (Agar stab test).
2. Temperature for growth: Optimum growth temperature lies around 30°C. The growth rate at 25°C and 37°C is lower than that at 30°C (Glucose nutrient medium).
3. PH for growth: Optimum growth pH lies between 7 and 8. Growth does not occur below pH 5.
4. Nitrate reduction: Nitrites are produced from nitrates, but $N_2$ gas is not produced from nitrates.

—Continued

| | | |
|---|---|---|
| 5. | O-F test: | Weakly fermentative. |
| 6. | Voges-Proskauer reaction: | Positive. |
| 7. | Indol formation: | Trace (in 6–15 days). |
| 8. | H₂S formation: | Negative. |
| 9. | Hydrolysis of starch: | Positive. |
| 10. | Utilization of citrate: | No growth on Koser's medium. Slight growth on Christensen's medium. |
| 11. | Urease activity: | Negative (in 1–10 days). |
| 12. | Kovac's oxidase test: | Negative. |
| 13. | Catalase activity: | Positive. |
| 14. | Utilization of carbohydrates | (Nutrient medium containing 1 % of carbohydrate, 30°C, 1–5 days). |

| Carbohydrate | Growth | Gas | Acid |
|---|---|---|---|
| L-Arabinose | + | − | + |
| D-Xylose | + | − | ± |
| D-Glucose | + | − | + |
| D-Mannose | + | − | + |
| D-Galactose | + | − | + |
| D-Fructose | + | − | + |
| Sucrose | + | − | − |
| Maltose | + | − | + |
| Lactose | + | − | +* |
| Trehalose | + | − | ± |
| Starch | + | − | + |
| Glycerol | + | − | + |
| Mannitol | + | − | − |
| Insitol | + | − | ± |

| | | |
|---|---|---|
| + | : | Good growth. Acid is produced. |
| − | : | Gas and acid are not produced. |
| ± | : | Acid is slightly produced. |
| * | : | Acid is produced when incubated over 6 days. |
| 15. | Resistance to NaCl | (Yeast extract-nutrient medium, 28°C, 1–6 days): Growth in 3.3 per cent NaCl; No growth in 7.0 per cent NaCl. |
| 16. | Methylene blue reduction: | Weakly reduced. |
| 17. | Tyrosinase activity: | Negative (Tyrosine agar). |

From the above results, it is apparent that the strain should be classified as belonging to the Genus Bacillus. Further, comparison of the morphological, cultural, and physiological characteristics with many species of Bacillus described in "Bergey's Manual of Determinative Bacteriology (seventh edition)" and other literature shows that in most of its properties the said strain is very similar to *Bacillus cereus*. Therefore, it is concluded that the strain of the present invention is of the *Bacillus cereus* species, and the microorganism of the present invention has been designated *Bacillus cereus* No. Gp-3.

It is to be understood that for the production of Gp-3, the present invention is not limited to the use of *Bacillus cereus* No. Gp-3. It is especially desired and intended to include the use of natural or artificial mutants produced from the described organism or variants belonging to *Bacillus cereus* as far as they can produce the antibiotic, Gp-3. The artifical production of mutants may be accomplished by a conventional operation such as X-ray or ultraviolet-ray irradiation, nitrosoguanidine, nitrogen mustards, 4-nitroquinoline N-oxide and other mutagens.

In the present invention, the new antibiotics, Gp-3, is produced during cultivation of the microorganisms, e.g. *Bacillus cereus* No. Gp-3, in an aqueous nutrient medium at a temperature of about 20° to about 37°C, preferably 25° to 35°C, under aerobic conditions, preferably submerged aerobic conditions. The composition of the nutrient medium may be varied over a very wide range. Essentially, what is required is a carbon source, a nitrogen source, and trace inorganic elements. Examples of suitable carbon sources are glucose, sucrose, xylose, fructose, galactose, inositol, mannitol, glycerin, dextrin, starch, organic acids, molasses and the like. Suitable sources of nitrogen for the fermentation process include meat extract, peptone, soy bean meal, corn steep liquor, yeast extract, peanut meal, wheat gluten, cotton seed flour, rice bran, casamino acid (acid hydrolysate of casein), NZ amine (enzymatic hydrolysate of casein), ammonium sulfate, ammonium carbonate, ammonium chloride and the like. Examples of suitable sources of inorganic elements are mineral salts such as sodium chloride, potassium chloride, calcium carbonate, potassium phosphate and the like. The nutrient medium may or may not be adjusted to about pH 7.0–8.0 prior to inoculation of the microorganism. The pH tends to remain around the said level during the fermentation, but, if variations are encountered, a buffering agent such as calcium carbonate may be added to the medium to maintain the pH at about 7.0–8.0. In addition, if excessive foaming is encountered, anti-foaming agents such as vegetable oils, lard oil, and polypropylene-glycol may be added to the fermentation medium prior to or in the course of the fermentation. For a large scale of production, it is preferred to carry out the fermentation under submerged aerobic conditions. The maximum yields of the antibiotic, Gp-3, can be attained within about 20 to about 100 hours, usually about 40 hours, of fermentation under optimum conditions of temperature and aeration.

After growth of the microorganism, the antibiotic, Gp-3, can be recovered from the culture broth by a per se conventional manner. The cell may be separated from the fermentation broth using standard equipment such as filter-press and centrifuge, then antibiotic Gp-3 may be recovered from the cell and the filtrate by a solvent extraction procedure. As antibiotic Gp-3 is retained by the filtrate in appreciable quantities, a solvent extraction procedure is preferably used to recover the antibiotic from the filtrate, or from the whole broth without removal of the filtrate. Suitable extraction solvent include dimethyl sulfoxide, aqueous methanol, aqueous ethanol, aqueous butanol, aqueous acetone and the like. For extraction of the antibiotic from a large volume of broth, however, an adsorption procedure is superior to a direct solvent extraction procedure. For instance, the whole broth may be filtered after the addition of a filter aid, such as Hyflo Super Cel (diatomaceous earth), and the resulting cake of filter aid and cell may be treated with a suitable organic solvent such as dimethyl sulfoxide, aqueous methanol, aqueous ethanol, aqueous butanol, or aqueous acetone to extract the antibiotic. The extract may be concentrated and, if necessary, a suitable solvent may be added to precipitate the crude active component.

The thus obtained crude active component may be further purified, if desired, by suitable operations such as reprecipitation, chromatography and the like. For example, reprecipitation may be carried out by dissolving the crude material in an organic solvent such as a mixture consisting of chloroform, methanol, and water, concentrating, and the adding ethanol to the solution. The preferred chromatographic adsorbents are silica gel, silicic acid and the like.

Thus obtained Gp-3, may when required, be converted into acid addition salts, ammonium salt, or metal salts suitable for pharmaceutical use, having low toxicity and desirable stability. Such a conversion can be effected in a conventional manner such as by treating the said Gp-3 with an acid, ammonium chloride or hydroxide in an appropriate solvent. Examples of the pharmaceutically acceptable acid-addition salts are hydrochloride, hydrobromide, hydroiodide, sulfate, phosphate, thiocyanate, oxalate, succinate, and naphthalenedisulfonate. Examples of the metal salt are sodium salt, potassium salt, calcium salt, magnesium salt, aluminum salt, iron salt and the like.

The physical and chemical properties of antibiotic Gp-3, its hydrochloric acid salt, and its dinitrophenyl derivative are as follows.

| Gp-3 | | | |
|---|---|---|---|
| | 1. Elementary analysis: | C, 54.36%, 54.78%; H, 7.19%, 7.28%; N, 14.45%, 14.69%; O, 20.70%, 21.14% | |
| | 2. Melting point: | The compound shows no definite melting point and decomposes progressively at over 190°C. | |
| | 3. Specific optical rotation: | $[\alpha]_D^{24.0} + 19.8 \pm 2.3°$ (c = 0.263%, in dimethylformamide) | |
| | 4. Ultraviolet absorption spectrum: | $\lambda_{max}^{MeOH}$ : 275 m$\mu$ ($E_{1\,cm}^{1\,\%}$ 36), 282 m$\mu$ ($E_{1\,cm}^{1\,\%}$ 38), 290 m$\mu$ ($E_{1\,cm}^{1\,\%}$ 33) | |
| | 5. Infrared absorption spectrum: | $\nu_{max}^{KBr}$ cm$^{-1}$: 3400, 2930, 1660, 1535, 1455, 1405, 1250. (See FIG. 1) | |
| | 6. Solubility: | Very soluble in dimethyl sulfoxide, dimethylformamide and dilute alkaline water. Slightly soluble in aqueous alcohols and aqueous acetone. Insoluble in ethyl acetate, chloroform, ether and petroleum ether. | |
| | 7. Color reaction: | Ninhydrin—positive Dragendorff—positive | |
| | 8. Color and form of the compound: | Colorless powder, amphoteric substance. | |
| | 9. Acid hydrolysis: | Aspartic acid (3), threonine (1) glycine (1), valine (1), alloisoleucine (1), phenylalanine (1), tryptophane (1), $\gamma$-hydroxylsine (1), ammonia (2–3) (The numbers in parenthesis are presumptive molar numbers). An acid hydrolysate of the compound (Gp-3) was extracted with ether, the ether extract was methylated, then the methylated fatty acid containing extract was analyzed by gas chromatography. As a result of a variety of methyl esters of fatty acids containing 11–17 carbon atoms were detected. | |
| | 10. Behavior on thin-layer chromatography. | | |
| | Carrier | Solvent | Rf value |
| | Silica gel | n-butanol-acetic acid-water (3 : 1 : 1 by volume) | 0.60 |
| | Silica gel | chloroform-ethanol-14% aqueous ammonia (4 : 7 : 2 by volume) | 0.40 |
| | Silica gel | chloroform-ethanol-water (4 : 7 : 2 by volume) | 0.55 |

Detection of the compound developed on a silica gel plate was conducted by bioautography using *Staphylococcus aureus* 209 P, ninhydrin reaction, and heat treatment of the plate sprayed by sulfuric acid.

The said chromatogram of Gp-3 prepared as described in Example 1 shows a single spot in each of the said solvent systems.

a therapeutic experiment in mice with experimental infection.

The new antibiotic Gp-3 and the salts thereof of the present invention are useful as a medicament and veterinary drug for inhibiting the growth of gram-positive pathogenic microorganism. It is also useful as a disinfectant.

Hydrochloroic acid salt of Gp-3
1. Color and form of the compound: Colorless powder.
2. Melting point: The compound decomposes progressively at over 195°C.
3. Specific optical rotation: $[\alpha]_D^{23.5} + 9.0 \pm 1.0°$ ( C=0.499%, in dimethylformamide).
4. Elementary analysis: C, 54.18%, 53.98%; H, 7.12%, 6.96%; N, 14.46%, 13.98%; Cl, 4.07%, 3.14%; O, 20.17%, 21.94% (balance)

Dinitrophenyl derivative of Gp-3
1. Color and form of the compound: Yellowish powder.
2. Melting point: 206–212°C (with decomposition)
3. Molecular weight: 1416 (by osmometry using pyridine)
4. Elementary analysis: C, 55.27%; H, 6.36%; N, 15.41%; O, 22.44%.
5. Ultraviolet absorption spectrum: $\gamma_{max}^{MeOH}$ : 353 m$\mu$ ($E_{1cm}^{1\%}$ 106, 109)

On the basis of the above physical and chemical properties, antibiotic Gp-3 is considered to be consisting of various new acylpeptides, each of which has the same peptide part of the molecule but is different in the acyl residue.

Antibiotic Gp-3 shows activity against a variety of microorganisms. The in vitro antimicrobial activity of Gp-3 was determined by the agar plate dilution method. The results are shown in Table 1.

Table 1

| Test microorganism | Minimum inhibitory concentration (mcg/ml) |
| --- | --- |
| *Bacillus subtilis* PCI 219 | 6.25 |
| *Bacillus anthracis* | 12.5 |
| *Staphylococcus aureus* 209 P JC-1 | 50 |
| *Streptococcus pyogenes* C-203 | 6.25 |
| *Diplococcus pneumoniae* | 6.25 |
| *Escherichia coli* NIHJ JC-2 | >50 |
| *Klebsiella pneumoniae* | >50 |
| *Salmonella typhimurium* | >50 |
| *Pseudomonas aeruginosa* | >50 |

Medium: Modified Mueller Hinton agar medium (Nissan).

It is seen from Table 1 that antibiotic Gp-3 is active against gram-positive bacteria.

Acute toxicity studies on antibiotic Gp-3 were carried out in mice, and the $LD_{50}$ value was found to be over 100 mg/Kg intraperitoneally. In addition, antibiotic Gp-3 is found to be highly active against *Diplococcus pneumoniae* type or *Streptococcus pyogenes* type in The antibiotic Gp-3 and the salts thereof can be administered orally, subcutaneously, intravenously or locally to human or animal in per se pharmaceutically conventional forms, e.g. injections, liquids suspensions, emulsions, ointments or tablets with suitable carriers, stabilizers, emulsifiers, preservatives and/or wetting agents, where a therapeutically effective amount of the active ingredient is contained.

The following examples are given solely for the purpose of illustration and are not to be construed as limitations of the present invention, many variations of which are possible.

EXAMPLE 1

*Bacillus cereus* No. Gp-3 (ATCC No. 21928) is inoculated to 130 ml of a nutrient medium (pH 7.0) composed of 1.0% of glucose, 0.25% of glycerin, 1.0% of peptone, 0.5% of meat extract, and 0.3% of sodium chloride, contained in a 500 ml shaking flask (Sakaguchi flask). The cultivation is performed at 28°C for 24 hours under shaking.

100 g of Hyflo Super Cel is added to about 5 liters of the cultured broth and filtered. The cell is extracted several times with 40% aqueous solution of acetone and the extract solution is evaporated under reduced pressure to removal the majority of the acetone. The resulting solution is extracted with butanol. On the other hand, the filtrate is extracted with butanol. The butanol extracts are combined, washed with water and concentrated under reduced pressure. Ethanol is then added to the concentrated solution, and the resulting precipitate formed in the solution is allowed to stand at 4°C and filtered. The obtained crude substance is dissolved in a mixture consisting of 3 volumes of chloroform, 6 volumes of methanol, and 2 volumes of water, and the solution is concentrated. Ethanol is again added to the concentrated solution. Thus, the operation of reprecipitation is repeated to give the crude substance (about 700 mg).

The crude substance (150 mg) is applied to a silica gel GF plate (thickness: 750 mμ, 100 × 20 cm) and developed with solvent consisting of chloroform-ethanol-14% aqueous ammonia (4:7:2 by volume). The part containing Gp-3 on the silica gel plate is extracted with a solvent consisting of chloroform-methanol-aqueous ammonia. The extract solution is concentrated under reduced pressure then extracted with butanol. The butanol extract is washed with water and evaporated under reduced pressure to give a purified Gp-'(about 100 mg) (free form) as colorless powder.

What is claimed is:

1. A process for producing antibiotic Gp-3, which comprises cultivating the antibiotic Gp-3-producing strain of Bacillus ATCC 21928 in an aqueous nutrient medium under aerobic conditions, and isolating the accumulated antibiotic from the cultured broth.

2. The process claimed in claim 1, wherein cultivation of said strain is carried out at a temperature from about 20° to 37°C.

3. The process claimed in claim 1, wherein the isolation of the antibiotic Gp-3 is carried out by filtering the cultured broth, and extracting both the cell and the filtrate with a suitable solvent.

4. An antibiotic, Gp-3, effective in inhibiting the growth of gram-positive microorganism, the said antibiotic being a colorless amphoteric powder which shows no definite melting point but progressively decomposes at over 190°C; contains the elements carbon, hydrogen, nitrogen and oxygen in substantially the following proportions by weight:

| Carbon | 54.36 %, 54.78 % |
| Hydrogen | 7.19 %, 7.28 % |
| Nitrogen | 14.45 %, 14.69 % |
| Oxygen | 20.07 %, 21.14 %; | has an optical rotation of $[\alpha]_D^{24.0} + 19.8 \pm 2.3°$ ($c = 0.263\%$, in dimethylformamide); has a dinitrophenyl derivative with a molecular weight of about 1,416 (by osmometry using pyridine); shows the formation of aspartic acid, threonine, glycine, valine, alloisoleucine, phenylalanine, tryprophane, γ-hydroxylysine, ammonia and a variety of fatty acids containing 11-17 carbon atoms on acid hydrolysis; and shows ultraviolet absorption (in methanol) at 275, 282 and 290 mμ and an infrared absorption spectrum as in the attached drawing FIG. 1.

5. The process of claim 2 wherein the cultivation is performed for 20 to 100 hours.

* * * * *